United States Patent [19]
Hashimoto

[11] Patent Number: 4,582,958
[45] Date of Patent: Apr. 15, 1986

[54] SECRETARY TELEPHONE SYSTEM

[75] Inventor: Kazuo Hashimoto, Tokyo, Japan

[73] Assignee: Hashimoto Corporation, Tokyo, Japan

[21] Appl. No.: 617,939

[22] Filed: Jun. 6, 1984

[30] Foreign Application Priority Data

Jul. 6, 1983 [JP] Japan .................. 58-100234

[51] Int. Cl.$^4$ .......................................... H04M 3/42
[52] U.S. Cl. .................................................. 179/18 BE
[58] Field of Search ........ 179/18 BE, 18 BD, 18 AB, 179/84 VF

[56] References Cited

U.S. PATENT DOCUMENTS

| | | | |
|---|---|---|---|
| 3,689,702 | 9/1972 | McCay | 179/18 BE |
| 3,704,346 | 11/1972 | Smith et al. | 179/18 BE |
| 3,965,306 | 6/1976 | Watkins | 179/81 R |
| 4,061,885 | 12/1977 | Nash et al. | 179/84 VF |
| 4,092,499 | 5/1978 | Lofmark | 179/84 VF |
| 4,117,270 | 9/1978 | Lesea | 179/18 BE |
| 4,277,650 | 7/1981 | Arend et al. | 179/84 VF |
| 4,352,194 | 9/1982 | Caracappa | 375/89 |
| 4,413,158 | 11/1983 | Danford | 179/90 BD |
| 4,439,639 | 3/1984 | Munter | 179/84 VF |

OTHER PUBLICATIONS

Brady et al., "Busy Call Diverter", *IBM Technical Disclosure Bulletin*, vol. 25, No. 4, Sep. 1982.

*Primary Examiner*—Stafford D. Schreyer
*Attorney, Agent, or Firm*—Lowe Price Leblanc Becker & Shur

[57] ABSTRACT

In a secretary telephone system for calling a transfer destination telephone set through given local lines of a telephone set different from a called party telephone set upon reception of a call from a calling party telephone set to the called party telephone set, the calling party telephone set can receive a busy signal in response to an output generated from a busy tone detector for detecting the busy tone when the transfer destination telephone set is set in an off-hook state. In addition, when a person at the transfer destination telephone set does not answer the phone within a predetermined period of time, the busy tone can be sent to the calling party telephone set in response to an output generated from a timer arranged therewith.

3 Claims, 4 Drawing Figures

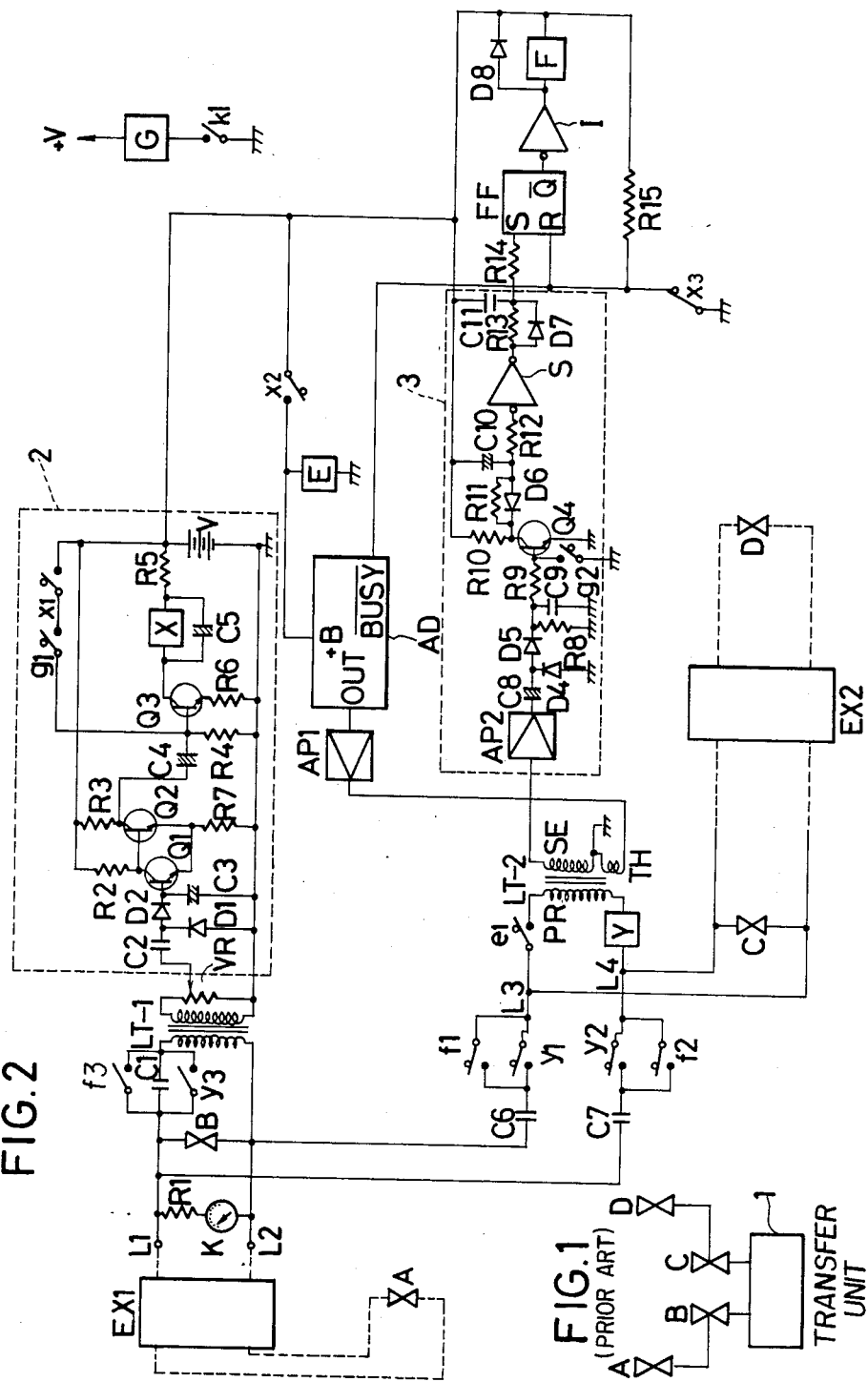

SECRETARY TELEPHONE SYSTEM

BACKGROUND OF THE INVENTION

The present invention relates to a secretary telephone system for transferring a received call to a secretary or the like at a remote location so as to allow the secretary to handle the received call.

In general, the secretary telephone system is arranged as follows. As shown in the schematic system diagram of FIG. 1, when a call is received from a calling party telephone set A to a called party telephone set B, a telephone transfer unit 1 is operated to call a remote telephone set D through a local line of another telephone set C installed in the residence (i.e., subscriber residence) of the called party. When the secretary or the like anwsers the transferred call at the telephone D, the telephone set B is bidirectionally connected to the telephone set C by the telephone transfer unit 1. As a result, the calling party with the telephone set A can communicate with the secretary or the like with the telephone set D.

In a conventional secretary telephone system, when the telephone transfer unit 1 calls the telephone set D through the local line of the telephone set C and a busy tone is returned from the telephone station to the local line of the telephone set C because the line of the telephone set D is busy, the calling party will not hear the busy tone since the telephone set A is not connected to the telephone set B. The calling party receives only the ringing tones. Therefore, although the line of the telephone set D is busy, the calling party waits for a long period of time since he believes that he is calling the telephone set B or D, resulting in inconvenience.

SUMMARY OF THE INVENTION

The present invention has been made to overcome the conventional drawbacks. It is a first object of the present invention to provide a secretary telephone system capable of sending a busy tone to a calling party when a call is transferred to a remote independent telephone set as a transfer destination telephone set through a telephone transfer unit and a line of the remote telephone set is busy.

It is a second object of the present invention to provide a secretary telephone system capable of sending to a calling party telephone a busy signal which is returned when a call is transferred to a remote telephone set through a telephone transfer unit and a line of the remote telephone set is busy.

It is a third object of the present invention to provide a secretary telephone system wherein, when a call is transferred through a telephone transfer unit to a transfer destination telephone set whose line is busy, a calling party telephone set is connected to and then disconnected from a called party telephone set (i.e., transfer source telephone set) connected to a telephone transfer unit (i.e., the calling party telephone set and the transfer source telephone set correspond to telephone sets A and B in FIG. 1, respectively), so that the calling party with the telephone set A can hear a busy signal generated from a central telephone exchange.

It is a fourth object of the present invention to provide a secretary telephone system wherein, when a call is transferred to a transfer destination telephone set and the transfer destination telephone set does not answer for a predetermined period of time, a calling party telephone set is connected to a transfer source telephone set (the calling party and transfer source telephone sets correspond to sets A and B in FIG. 1, respectively) for a short period of time and is then disconnected therefrom, so that a busy signal generated from a central telephone exchange can be heard by the calling party with the telephone set A.

In order to achieve the above objects of the present invention, in a secretary telephone system capable of connecting a calling party telephone set and a transfer destination telephone set installed near a secretary or the like, the connection being made by means of an automatic dial unit through a given local line of a telephone set different from that of the called party telephone set, when a call from the calling party telephone set is received by a called party telephone set, a busy detector is arranged to detect a busy tone sent by a central telephone exchange through the given local line, and the busy signal is sent to the calling party telephone set when the busy detector detects the busy tone. When the busy detector detects a busy state of the transfer destination telephone set, the busy detector causes the called party telephone set to communicate with the given local line and simultaneously the calling party telephone set to connect with the called party telephone set, whereby the calling party can directly hear the busy tone. Alternately, when the busy detector detects the busy tone, the local line of the called party telephone set is looped for a short period of time to cause the calling party to hear the busy tone generated from a central telephone exchange located between the calling party telephone set and the called party telephone set.

Furthermore, according to the present invention, a timer is arranged in place of the busy detector. When a call is received by the called party telephone set, the timer is started. When the transfer destination telephone set does not return an off-hook signal within a predetermined period of time due to a busy state or any other reason, the timer generates an output to loop the local line of the called party telephone set so as to cause the calling party to hear the busy tone generated from the central telephone exchange located between the calling party telephone set and the called party telephone set.

In the secretary telephone system of the present invention, when the transfer destination telephone line is busy, the busy tone can be sent to the calling party telephone set. Unlike in the conventional secretary telephone system, the calling party need not continue wasteful ringing. In addition, in the secretary telephone system of the present invention, when the call is transferred to the transfer destination telephone set and this telephone set does not answer the call for a predetermined period of time, the system detects that the transfer destination telephone set line is busy as is usually the case. Under this condition, the system utilizes a simple circuit arrangement to cause the calling party to hear the busy tone, thereby preventing the calling party from wasteful ringing.

BRIEF DESCRIPTION OF THE DRAWINGS

FIG. 1 is a schematic diagram showing the basic configuration of a conventional secretary telephone system;

FIG. 2 is a circuit diagram of a secretary telephone system according to a first embodiment of the present invention;

DETAILED DESCRIPTION OF THE PREFERRED EMBODIMENTS

Figure 3:
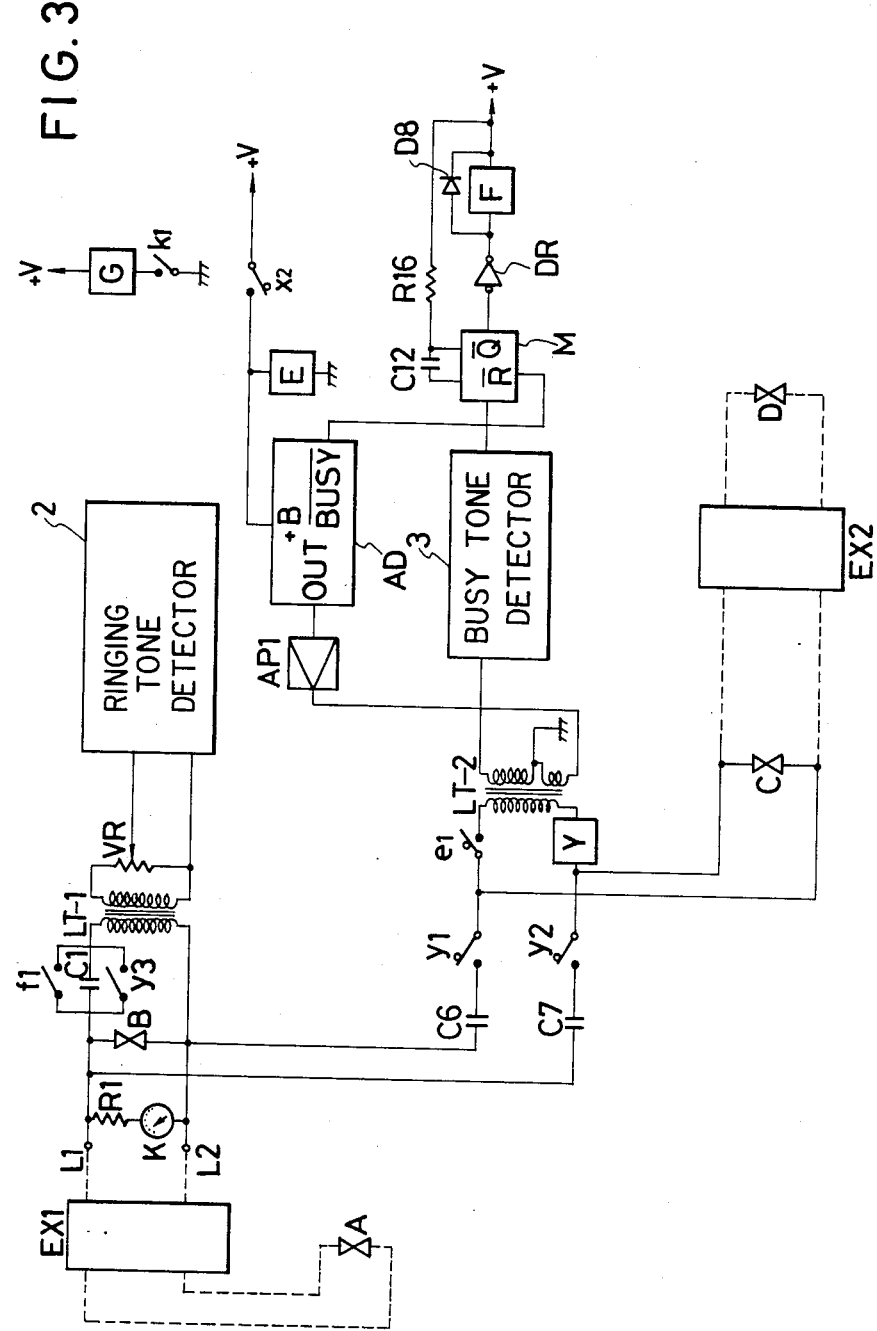
FIG. 3 is a circuit diagram of a secretary telephone system according to a second embodiment of the present invention.

FIG. 2 shows a first embodiment of the present invention. Reference symbols A, B, C and D denote telephone sets, respectively; EX1 and EX2, central telephone exchanges, respectively; L1, L2, L3 and L4, local lines, respectively; and K, a meter relay. The meter relay K is inserted between the local lines L1 and L2, as shown in FIG. 2. Reference numerals LT-1 and LT-2 denote line transformers, respectively. A semi-fixed resistor VR is connected to the secondary winding of the line transformer LT-1, as shown in FIG. 2. A signal is supplied from the semi-fixed resistor VR to a ringing tone detector 2. More particularly, the signal from the semi-fixed resistor VR is supplied to transistors Q1 and Q2 through a rectifing circuit comprising a capacitor C2, diodes D1 and D2, and a capacitor C3. A capacitor C4 and a resistor R4 are commonly connected to the base of a transistor Q3. A relay X serves as a load of the transistor Q3. The relay X is connected to a power supply through a resistor R5. A contact g1 of a relay G (to be described later) is connected in series with a contact x1 of a relay X. The primary winding of the line transformer LT-1 is coupled to the local lines L1 and L2 through the capacitor C1. Relay contacts f3 and y3 are connected in parallel with each other so as to short-circuit the capacitor C1.

The local lines L3 and L4 are assigned to the telephone set C and are connected to the local lines L1 and L2 through a set of a capacitor C6 and relay contacts f1 and y1 and a set of a capacitor C7 and relay contacts f2 and y2, respectively. A primary winding PR of the line transformer LT-2 is connected to the local lines L3 and L4 through a relay contact e1 and a relay Y. The relay Y operates upon inversion of the signal polarities on the local lines L3 and L4. A secondary winding SE of the line transformer LT-2 is connected to a busy tone detector 3. A tertiary winding TH of the line transformer LT-2 is connected to an amplifier AP1 for amplifying an output generated from an automatic dial unit AD.

The busy tone detector 3 is arranged such that a signal from the secondary winding SE of the line transformer LT-2 is amplified by an amplifier AP2, an amplified signal is rectified by diodes D4 and D5, capacitors C8 and C9 and the like, and a rectified signal is supplied to the base of a transistor Q4. The collector of the transistor Q4 is connected to a charge/discharge circuit which comprises a diode D6, resistors R10 and R11 and a capacitor C10. An output from the charge/discharge circuit is supplied to a Schmitt trigger circuit S. An output from the Schmitt trigger circuit S charges a capacitor C11 through a diode D7 and a resistor R13. An output from the busy tone detector 3 is supplied to a set input terminal S of a flip-flop FF. A Q output terminal of the flip-flop FF is connected to a relay F through an inverter I. The relay F is operated in response to this $\bar{Q}$ output generated from the flip-flop FF. A reset terminal R of the flip-flop FF is connected to the "BUSY" terminal of the automatic dial unit AD and is grounded through a break contact x3 of the relay X. The input terminal of the automatic dial unit AD is connected to a contact x2 of the relay X and a relay E. When the contact x2 is set in the make state, the relay E and the automatic dial unit AD are operated. A contact k1 of meter relay K is connected to operate the relay G. It should be noted that reference numeral V denotes a power supply.

The operation of the secretary telephone system according to the first embodiment will be described hereinafter. When a call is made by a calling party at a telephone set A and is received by a telephone set B through the central telephone exchange EX1, a ringing signal of a predetermined frequency (e.g., a 16-cycle ringing signal) is applied across the local lines L1 and L2. This signal is applied to the primary winding of the line transformer LT-1 through the capacitor C1 and is supplied to the ringing tone detector 2 through the semi-fixed resistor VR connected to the secondary winding of the line transformer LT-1. The ringing signal is rectified by the capacitor C2 and the diodes D1 and D2, and the rectified signal charges the capacitor C3. A bias voltage from the capacitor C3 is applied to the base of the transistor Q1 constituting the Schmitt trigger circuit. The transistor Q1 is turned on, and then the transistor Q2 is turned off. The collector voltage at the transistor Q2 becomes positive, so that the transistor Q3 is turned on through the capacitor C4. In turn, the transistor Q3 is kept ON while the ringing signal is received. When the ringing signal is no longer received, the transistor Q3 is turned off. When the transistor Q3 is turned on, the relay X is operated. Even after the transistor Q3 is turned off, the relay X is kept ON due to the charged capacitor C5. In the first embodiment, when the ringing signal is not received for over three seconds, the relay X is kept ON. For this reason, as long as a ringing signal which repeats a break of two seconds and a make of one second is received, the relay X is continuously operated to set the contacts x1, x2 and x3 in the make state. When the make-break cycle of the ringing signal is different from that described above, a capacitance of the capacitor C5 and a resistance of the resistor R5 must be selected such that the relay X can be continuously operated as long as a ringing signal having any make-break cycle is received. In this manner, when the contact x2 is set in the make state, the relay E is energized to set the contact e1 in the make state, thereby looping the telephone set C. At the same time, the automatic dial unit AD is started. A telephone number (e.g., abbreviated form) signal is generated from an output terminal OUT of the automatic dial unit AD. This signal is amplified by the amplifier AP1 and is supplied to the central telephone exchange EX2 through the tertiary and primary windings TH and PR of the line transformer LT-2. The central telephone exchange EX2 then starts calling the telephone set D.

When the telephone set D is set in the on-hook state, the telephone set D rings, and a ring back tone is returned to the local lines L3 and L4 of the telephone set C. However, when the telephone set D is set in the off-hook state, the busy tone is returned to the local lines L3 and L4 of the telephone set C.

When the telephone set D is set in the on-hook state, the secretary hears the ringing tone and picks up the handset of the telephone set D. The relay Y is then operated upon inversion of the polarities of the local lines, and the contacts y1, y2 and y3 are set in the make state. The local lines L1 and L2 are audibly looped with the local lines L3 and L4 through the capacitors C6 and C7, so that the calling party at the telephone set A can communicate with the secretary at the telephone set D. When the contact y3 of the relay Y is set in the make state, the pointer of the meter relay K swings clockwise (opposite to the direction shown in FIG. 2), and the contact k1 is closed. For this reason, the relay G is operated to set the contacts g1 and g2 in the make state. The relay X is kept ON through the contact g1 and the contact x1 of the relay X.

The contact g2 of the relay G is connected to the base of the transistor Q4 in the busy tone detector 3 so as to prevent erroneous operation of the busy tone detector 3 which is caused by communication between the telephone sets A and D after normal transfer operation is completed.

On the other hand, when the telephone set D is held in the off-hook state, the busy signal is sent to the local lines L3 and L4 of the telephone set C. The busy signal is supplied to the busy tone detector 3 through the primary and secondary windings of the line transformer LT-2, and comprises an INT which is alternately enabled and disabled every 0.5 seconds. This busy signal is amplified by the amplifier AP2. An amplified signal is rectified by the diodes D4 and D5 and the like to turn on the transistor Q4, thereby charging the diode D6 through the capacitor C10. In this manner, the transistor Q4 is turned on to charge the capacitor C10 while the busy signal is enabled for every 0.5 interval (i.e., while the calling party hears the busy signal tone). However, the transistor Q4 is turned off to discharge the capacitor C10 while the busy signal is disabled for every 0.5 interval (i.e., while the calling party does not hear the busy signal tone). However, when a time constant of the charge/discharge circuit consisting of the resistors R10 and R11 and the capacitor C10 is set to be about 1.2 seconds (it should be noted that the time constant is preset in accordance with the on-off period of the busy tone), the capacitor C10 cannot be completely discharged for 0.5 seconds and is kept charged. As a result, the input and output with respect to the Schmitt trigger circuit S are kept at L level, so that the capacitor C11 is charged through the resistor R13. Therefore, the capacitor C11 is completely charged within a predetermined period of time (the time constant of the resistor R13 and the capacitor C11 is set to be 3 seconds in this embodiment), so that the set terminal S of the flip-flop FF goes to L level. The flip-flop FF is set and the relay F is operated through the inverter I. When the contact x3 of the relay X is set in the make state, the flip-flop FF is released from the reset state. While the abbreviated dialing tone is generated from the automatic dial unit AD, a reset signal is supplied from the "BUSY" terminal of the automatic dial unit AD to the reset input terminal R of the flip-flop FF to prevent erroneous operation caused by the abbreviated dialing tone.

When the relay F is operated as described above, the contacts f1, f2 and f3 are set in the make state, and the telephone set B is looped with the telephone set A through the contact f3. A ring back tone will no longer be returned to the telephone set A. At the same time, since the contacts f1 and f2 are set in the make state, the local lines L1 and L2 are mutually coupled to the local lines L3 and L4. The busy tone returned to the local lines of the telephone set C is sent to the telephone set A through the local lines L3 and L4 and L1 and L2. As a result, the calling party can hear the busy tone at the telephone set A.

The ring back tone other than the busy tone is also supplied to the busy tone detector 3 through the line transformer LT-2 to turn on/off the transistor Q4. The ring back tone has a shorter ON period and a longer OFF period than those of the busy tone. For example, the ring back tone has an ON period of 1 second and an OFF period of 2 seconds. The transistor Q4 is turned on to charge the capacitor C10 while the ring back tone signal is enabled. However, the capacitor C10 is completely discharged while the ring back tone signal is disabled for 2 seconds since the time constant of the discharge circuit consisting of the resistors R10 and R11 and the capacitor C10 is shorter than 2 seconds (i.e., 1.2 seconds in this embodiment). The input and output with respect to the Schmitt trigger circuit S repeat H and L levels. For this reason, the capacitor C11 is not charged, and the busy tone detector 3 will not generate the set signal for setting the flip-flop FF. Thus, the flip-flop FF is not set and the relay F is not operated. The telephone set A will not therefore be coupled to the telephone set D.

FIG. 3 is a circuit diagram of a secretary telephone system according to a second embodiment of the present invention. The same reference numerals used in FIG. 3 denote the same parts as in FIG. 2. A ringing tone detector 2 and a busy tone detector 3 have the same arrangement as those shown in FIG. 2, so that these circuits in FIG. 3 are illustrated by blocks, respectively.

In the first embodiment, the call from the telephone set A to the telephone set B is transferred to the telephone set D through local lines of the telephone set C. When the line of the telephone set D is busy, the busy tone generated from the central telephone exchange EX2 located between the telephone sets C and D is supplied to the telephone set A. However, according to the second embodiment, unlike in the first embodiment described above, when the line of the transfer destination telephone set D is busy, local lines L1 and L2 connected to a telephone set B are looped for a short period of time so as to supply a busy tone to a telephone set A from a central telephone exchange EX1 located between the telephone set A and a called party telephone set B. The secretary telephone system of the second embodiment has substantially the same arrangement as that of the first embodiment, except that the output from the busy tone detector 3 is supplied to a monostable multivibrator M in place of the set input terminal of the flip-flop FF shown in FIG. 2, and that contacts of a relay F driven by a driver DR in response to the output generated from the monostable multivibrator M are not parallel with contacts y1 and y2 of the relay Y.

The operation of the secretary telephone system according to the second embodiment of the present invention will be described hereinafter.

When a call from the telephone set A is received at the telephone set B, in the same manner as in the first embodiment, the ringing signal is detected by the ringing tone detector 2, and a relay X in the ringing tone detector 2 is kept ON while the ringing signal is received. When the relay X is operated, the contact x2 is set in the make state, so that a relay E is operated to set its contact e1 in the make state. The telephone set C is looped in the telephone network, and an automatic dial unit AD is started. A telephone number (in the form of an abbreviated dialing signal) of the telephone set D is supplied to a central telephone exchange EX2 through a line transformer LT. The central telephone exchange EX2 starts calling the telephone set D. While the ringing signal is generated, the ring back tone is returned to the local lines of the telephone set C. In the same manner as described with reference to the first embodiment, the busy tone detector 3 is not operated and continuously calls the telephone set D. When a secretary answers the phone, the polarities of the telephone lines are inverted to operate the relay Y, so that its contacts y1 and y2 are set in the make state. In the same manner as in the first embodiment, the calling party at the telephone set A can communicate with the secretary at the telephone set D. However, when the telephone set D is determined to be set in the off-hook state upon calling of the telephone set D, the busy tone is returned from the central telephone exchange EX2 to the local lines of the telephone set C. The busy tone signal is detected by the busy tone detector 3 in the same manner as in the first embodiment. An output from the busy tone detector 3 is supplied to the monostable multivibrator M. A pulse signal from the monostable multivibrator M is supplied to the driver DR which then drives the relay F for a short period of time (1 second in the second embodiment). The contact f1 is set in the make state. For this reason, the telephone set B is looped for a short period of time, and the telephone set A receives the busy tone generated from the central telephone exchange EX1. As a result, the calling party at the telephone set A knows that the called party is engaged.

Figure 4:
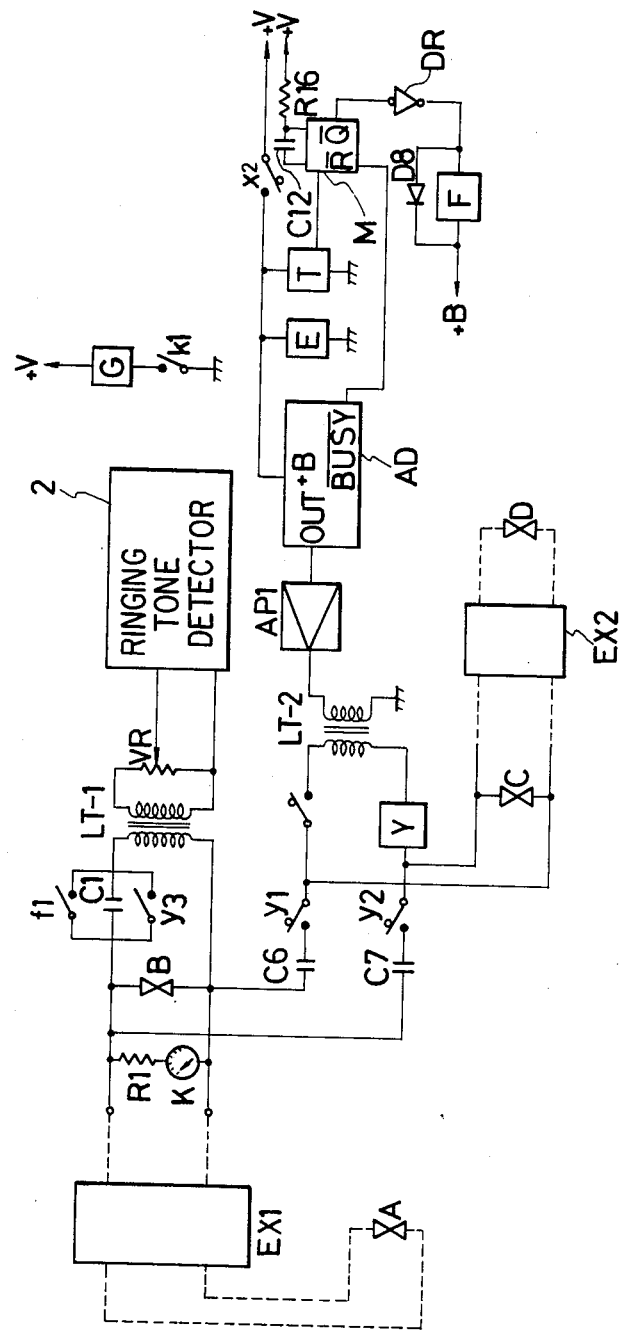
FIG. 4 is a circuit diagram of a secretary telephone system according to a third embodiment of the present invention.

FIG. 4 shows a secretary telephone system according to a third embodiment of the present invention. According to the third embodiment, unlike in the first and second embodiments, when a secretary at a telephone set D does not answer the phone because the telephone set D is set in the off-hook state or for any other reason, local lines L1 and L2 connected to a telephone set B are looped for a short period of time so as to send a busy tone from a central telephone exchange EX1 to a calling party telephone set A. The main difference between the secretary telephone system of the third embodiment and those of the first and second embodiments resides in that in the third embodiment the busy tone detector 3 is not arranged, that a timer T is arranged in parallel with a relay E instead of the busy tone detector 3, and that a monostable multivibrator M and a relay F are operated in accordance with the timer T.

The operation of the secretary telephone system according to the third embodiment of the present invention will be described hereinafter.

In the same manner as in the first and second embodiments, a call is made from the telephone set A and is received as the telephone set B, a ringing tone detector 2 is started to operate an automatic dial unit AD, and the automatic dial unit AD generates an abbreviated dialing signal to call the telephone set D through the local lines of the telephone set C. In the third embodiment, the ringing tone detector 2 is operated to energize a relay X, and its contact x2 is set in the make state to operate the automatic dial unit AD and the relay E. At the same time, the timer T is started. When the secretary at the telephone set D does not answer the phone within a predetermined period of time (i.e., when the busy tone or ring back tone is returned to the telephone set C for the predetermined period of time), the count of the timer T reaches a preset value, and a signal is supplied to the monostable multivibrator M. Thereafter, an output from the monostable multivibrator M is supplied to a driver DR which then drives the relay F for a short period of time (e.g., 1 second), thereby setting its contact f1 in the make state. As a result, the busy tone is sent from the central telephone exchange EX1 to the telephone set A. However, when the telephone set D is set in the off-hook state within the predetermined period of time, the relay Y is operated in the same manner as in the first and second embodiments, and the contacts y1, y2 and y3 are set in the make state. The calling party at the telephone set A can thus communicate with the secretary at the telephone set D.

In the above embodiments, the calling party telephone set A is a general subscriber telephone set. However, if the telephone set A comprises a charging system telephone set, inserted coins can be returned to the user by adjusting the loop time, as the telephone set is looped in the telephone network in the second and third embodiments. For this reason, when the calling party telephone set is a charging system telephone set, the calling party hears the busy signal and hangs up the handset, and no charge is made.

What is claimed is:

1. A secretary telephone system for calling a transfer destination telephone set through given local lines of a telephone set different from a called party telephone set upon reception of a call from a calling party telephone set to said called party telephone set, comprising busy tone detector means for detecting a busy tone generated from a central exchange when said transfer destination telephone set is busy, and coupling means operated in response to an output generated from said busy tone detector means to establish (1) a communication path between said given local lines and said called party telephone set and (2) a loop circuit between said calling party telephone set and said called party telephone set, whereby said calling party receives the busy tone generated from the central telephone exchange.

2. A secretary telephone system for calling a transfer destination set through given local lines of a telephone set different from a called party telephone set upon reception of a call from a calling party telephone set to said called party telephone set, comprising detector means for detecting a busy tone from a central exchange when said transfer destination telephone set is busy, circuit means operated in response to an output generated from said busy tone detector means to establish momentarily a loop circuit on local lines of said called party telephone set and thereafter open said loop circuit, whereby said calling party telephone set receives the busy tone generated from the central telephone exchange.

3. A secretary telephone system for calling a transfer destination telephone set through given local lines of a telephone set different from a called party telephone set upon reception of a call from a calling party telephone set to said called party telephone set, comprising a timer means which is initiated upon reception of the call by the called party telephone set, means to establish momentarily a loop circuit in the local lines of said called party telephone set and thereafter open said loop circuit if said transfer destination telephone set is not answered within a predetermined period of time determined by the timer, whereby the calling party telephone set receives the busy tone generated from a central telephone exchange.

* * * * *

UNITED STATES PATENT AND TRADEMARK OFFICE
CERTIFICATE OF CORRECTION

PATENT NO. : 4,582,958

DATED : April 15, 1986

INVENTOR(S) : Kazuo HASHIMOTO

It is certified that error appears in the above-identified patent and that said Letters Patent is hereby corrected as shown below:

```
[30]      Foreign Application Priority Data
   June 7, 1983 [JP]   Japan.................58-100234
```

Signed and Sealed this

Fifth Day of August 1986

[SEAL]

Attest:

DONALD J. QUIGG

Attesting Officer

Commissioner of Patents and Trademarks